IMPROVEMENT IN SAW-HORSES OR BUCKS.

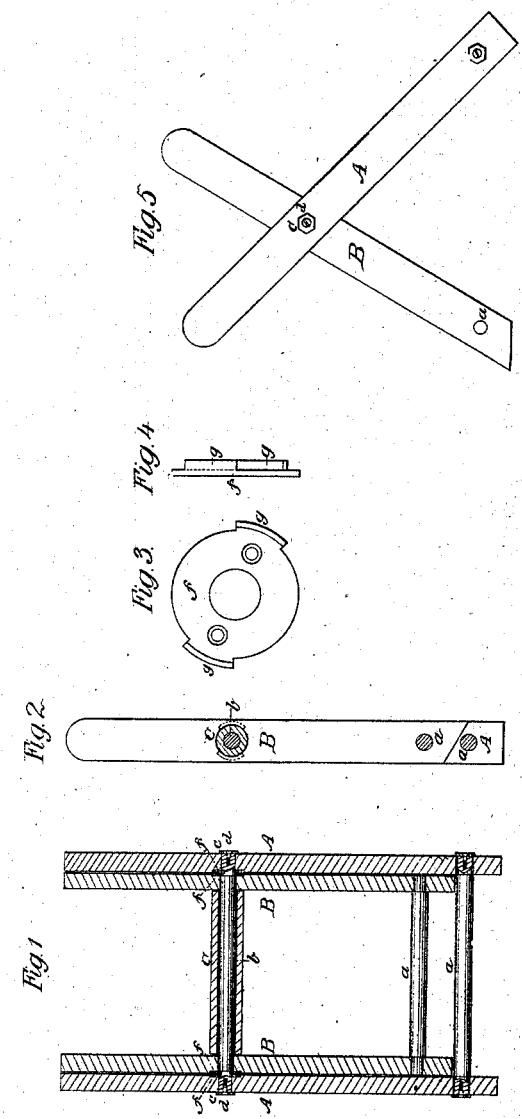
H. M. Hayward,
Saw Buck,
N° 60,371.  Patented Dec. 11, 1866.
Witnesses  Inventor

United States Patent Office.

HENRY M. HAYWARD, OF BOSTON, MASSACHUSETTS.

Letters Patent No. 60,371, dated December 11, 1866.

---

The Schedule referred to in these Letters Patent and making part of the same.

---

TO ALL PERSONS TO WHOM THESE PRESENTS SHALL COME:

Be it known that I, HENRY M. HAYWARD, of Boston, in the county of Suffolk, and State of Massachusetts, have made a new and useful invention having reference to Saw-Horses; and I do hereby declare the same to be fully described in the following specification, and represented in the accompanying drawings, of which—

Figure 1 is a longitudinal, and

Figure 2 a transversed section of a saw-horse in a folded state and provided with my invention.

Figure 3 is a side view, and

Figure 4 an edge view of one of the plates or parts of its stop-joint.

Figure 5 is a side view of the horse, as unfolded or ready for receiving a log of wood to be sawed.

The said saw-horse consists in the main of two sets of parallel bars, A A and B B, one of which has its bars arranged between and against those of the other. Each pair of bars is connected near their lower ends, by one of two ties or cross-bars, $a$ $a$ secured into them. Where the two sets of bars are intended to cross one another, a cylindrical shaft or rod, $b$, is extended through them, it being connected to the two inner bars. The two outer bars turn freely on it, and are kept in place by washers, $c$ $c$, and screws, $d$ $d$, the said washers being applied to the ends of the shaft and affixed thereto by the screws. A roller, C, is placed on and so as to be capable of being freely revolved on the shaft, and extends from one of the inner bars to the other. Should the saw, after having sawed through a log, be brought and moved against the roller, the latter, in consequence of being capable of freely revolving on the shaft, will not be so likely to be injured by the saw as it would were it stationary, as is the middle bar of a common saw-horse, as ordinarily made, which in a short time becomes cut through or greatly damaged by the saw. I apply to two of the bars, A B, which are next adjacent to each other, what I term a stop-joint, it being composed of two circular flat annuli, $f$ $f$, each of which has one or two flanges, $g$ $g$, extending from one side of it at its periphery, the same being as shown in figs. 3 and 4. I fasten by means of screws one of these annuli to the inner side of each of the said bars A B, and arrange the annuli concentrically with the shaft or rod $b$, and so that each of the flanges of one of the said annuli may overlap the periphery of the other between its two flanges. When the saw-horse is opened, or its parts are in position to receive a log, the flanges of one annulus bring up against those of the other, so as to arrest the bars A A and B B in their proper angular positions, and hold them therein while the log is in the act of being sawed. They also admit of the two inner bars being folded within and in the same plane with the outer ones.

I claim as my invention the following, viz:

I claim the improved saw-horse as constructed with stop-joints as described.

I also claim the application or arrangement of the roller with a saw-horse so as to operate or turn on its middle connecting rod or bar in manner and for the purpose as hereinbefore set forth.

HENRY M. HAYWARD.

Witnesses:
R. H. EDDY,
F. P. HALE, Jr.